United States Patent [19]

Ohta

[11] Patent Number: 4,896,237
[45] Date of Patent: Jan. 23, 1990

[54] MAGNETIC TAPE CARTRIDGE COMPATIBLE WITH DISK DRIVE AND TAPE DRIVE MECHANISM THEREFOR

[75] Inventor: Toshiro Ohta, Kanagawa, Japan

[73] Assignee: Sony Corporation, Tokyo, Japan

[21] Appl. No.: 900,884

[22] Filed: Aug. 27, 1986

[30] Foreign Application Priority Data

Aug. 30, 1985 [JP] Japan .................................. 60-189887
Aug. 30, 1985 [JP] Japan ........................... 60-131692[U]

[51] Int. Cl.⁴ ............................................. G11B 23/02
[52] U.S. Cl. ...................................... 360/132; 360/93; 360/96.3
[58] Field of Search ................................ 360/132–133, 360/93, 96.3; 242/55.19 A, 198–199

[56] References Cited

U.S. PATENT DOCUMENTS

4,293,882 10/1981 Moris ..................................... 360/93

Primary Examiner—John H. Wolff
Attorney, Agent, or Firm—Lewis H. Eslinger; Jay H. Maioli

[57] ABSTRACT

A magnetic tape cartridge is compatible with a disk drive, which comprises a cartridge casing defining a thin space, a pair of tape reels onto which a magnetic tape is wound and means for defining a path for the magnetic tape along which a portion of the tape is exposed at a location at which data can be transferred between the tape and the disk drive head. The tape reels are associated with a drive mechanism for selectively driving one of the tape reels for driving the tape between the tape reels. The drive mechanism includes a center core driven to rotate by means of a turntable. The drive mechanism further includes a power train including reel drive gears designed to drive associated tape reels and an input gear drivingly connected to the center core so as to be driven by the turntable. The input gear is associated with means for selectively meshing the input gear to one of the reel drive gears depending upon the direction of rotation of the center core.

26 Claims, 5 Drawing Sheets

MAGNETIC TAPE CARTRIDGE COMPATIBLE WITH DISK DRIVE AND TAPE DRIVE MECHANISM THEREFOR

BACKGROUND OF THE INVENTION

The present invention relates generally to a magnetic tape cartridge for use as a data storage media. More specifically, the invention relates to a magnetic tape cartridge compatible with a disk drive and being particularly useful as backup storage media for a computer. Further particularly, the invention relates to a tape drive mechanism for a disk-drive-compatible magnetic tape cartridge, which tape drive mechanism requires very little vertical clearance within a cartridge casing and can steadily drive the tape.

As is well known, magnetic tape has a relatively large data storage capacity. Magnetic tape is especially useful as a storage medium when fast access is not required, such as when used for backup storage. However, on the other hand, because of the relatively slow access of the desired data, tape is less popular than disk-type storage media, such as floppy disks, hard disks and so forth. Therefore, recent computers generally employ disk-based data storage systems as built-in or external units.

Various floppy disks and disk drives designed for use with associated disks have been developed and proposed. For example, the U.S. Pat. No. 4,445,155, issued on Apr. 24, 1984, to Takahashi et al discloses a typical construction of a microfloppy disk, i.e. a 3.5-inch floppy disk and a disk drive therefor. The floppy disk is in the form of a floppy disk cassette or cartridge generally comprising a flexible magnetic disk and a cassette or cartridge casing. The flexible disk includes a center core disk designed to be chucked on a turntable of the disk drive. The disk drive drives the flexible disk and the center core disk to rotate.

The floppy disks are useful for fast access. On the other hand, floppy disks have limited data storage capacity. Archival or backup storage of data stored on a hard disk generally takes 20 to 80 floppy disks due to their larger capacity. This involves substantial expense for the user. On the other hand, magnetic tape can easily accommodate all of the data stored on a hard disk, as is well known. However, a special tape recording and/or reproducing apparatus has previously been necessary for copying data from the hard disk onto the magnetic tape storage medium. This is an additional expense for the user.

So as to allow the user to utilize magnetic tape for inexpensive backup storage of data on hard disks or floppy disks, it would be beneficial to provide a magnetic tape cartridge compatible with floppy disk drives so that it may be driven by the same drive unit as floppy disks.

SUMMARY OF THE INVENTION

Therefore, it is an object of the present invention to provide a magnetic tape cartridge which is compatible with disk drives, and thus is useful for backup storage for computers.

Another and more specific object of the invention is to provide a tape drive mechanism for a disk-drive-compatible magnetic tape cartridge which requires very little space for installation within a tape cartridge casing.

A further object of the invention is to provide a tape drive mechanism for a disk-drive-compatible magnetic tape cartridge which includes a power train for transmitting driving force from a disk drive to drive a tape with minimum loss of torque.

In order to accomplish the aforementioned and other objects of the invention, a magnetic tape cartridge, according to the invention, comprises a cartridge casing defining a thin space, a pair of tape reels onto which a magnetic tape is wound and means for defining a path for the magnetic tape along which a portion of the tape is exposed at a location at which data can be transferred between the tape and the disk drive head. The tape reels are associated with a drive mechanism for selectively driving one of the tape reels for driving the tape between the tape reels. The drive mechanism includes a center core driven to rotate by means of a turntable. The drive mechanism further includes a power train including reel drive gears designed to drive associated tape reels and an input gear drivingly connected to the center core so as to be driven by the turntable. The input gear is associated with means for selectively meshing the input gear to one of the reel drive gears depending upon the direction of rotation of the center core.

According to one aspect of the invention, a magnetic tape cartridge compatible with a disk drive for transferring data between a magnetic tape and a disk drive head, comprises means for defining a tape run path for passing across the disk drive head for transferring data between the magnetic tape and the disk drive head, first and second reels provided respective ends of the tape run path and wound therearound the magnetic tape for feeding the magnetic tape from one to the other, means for selectively driving one of the first and second tape reel for winding the magnetic tape thereon from the other reel, the driving means including a first gear provided for rotation with the first reel, a second gear provided for rotation with the second reel and a third gear connected to a drive mechanism of the disk drive to be driven by driving force of the driving mechanism and selectively co-operated with one of the first and second gears depending upon driving direction of the drive mechanism.

The magnetic tape cartridge further comprises means for transmitting driving force of the drive mechanism of the disk drive to the third gear. The driving force transmitting means include a rotary disk member rotatable with a turntable of the drive mechanism about a common rotation axis thereof and the third gear is rotatable about an axis essentially parallel to the common axis of the rotary disk member and the turntable.

In the preferred embodiment the magnetic tape cartridge further comprises means for converting rotational force of the third gear to a force for shifting the third gear between the first and second gears.

The tape reel driving means includes means for converting rotation of the third means about the rotation axis thereof into a rotation of co-operated one of the first and second gears about an axis extending essentially perpendicular to the rotation axis of third gear, which first and second gears are rotatable about common axes to the corresponding first and second reels. The third gear is rotatably mounted on a pivotal base pivotable about its pivot axis, the third gear being cooperated with means for restricting rotation of the third gear and whereby converts the driving force of the driving mechanism into a force for causing pivotal movement of the pivotal base with the third gear. The restricting means is responsive to a resistance, created by engagement of the third gear to one of the first and second gears, against pivotal movement of the pivotal base with the third gear for releasing the third gear from restriction to allow the third gear to rotate for driving one of first and second gears to which the third gear engages.

According to one embodiment, the rotational force converting means comprises a pinion gear releasably coupled with the third gear and engaging with a rack plate extending along the radius of shifting of the third gear, the pinion gear being maintained at coupled condition with the third means while shifting of the third gear is permitted and released from the third gear when third gear engages with one of the first and second gears at the end of shifting thereof. In the alternative, the rotation converting means comprises the first and second gears comprising bevel gears and intermediate gears having a plane gear sections engageable with the third gear to be driven by the latter and bevel gear sections constantly engaging with the first and second gears for transmitting driving force input through the third means to the first and second means. In the further alternative, the rotation converting means comprises a bevel gear section formed in the third gear and bevel gears forming the first and second gears.

According to another aspect of the invention, a disk-drive-compatible magnetic tape cartridge comprises a cartridge having a first section of substantially the same size and same configuration as a corresponding size of floppy disk and defining therein a tape run path extending across a position at which data is transferred between a magnetic tape and a disk drive head, and a second section provided rear side of the first section and defining a space a supply reel and a take-up reel disposed within the space defined within the second section of the cartridge, the supply reel and the take-up reel being rotatable about an axis extending laterally, a first gear coupled with the supply reel for rotation therewith, a second gear coupled with the take-up reel for rotation therewith, and a power train for selectively transmitting driving force of a disk drive to one of the first and second gears, the power train including a third gear movable between a first position where the driving force of the disk drive is transmitted to the first gear, and a second position where the driving force is transmitted to the second gear, the third gear being responsive to a rotational driving force to rotatingly drive the same in first direction to shift at the first position and to a rotational driving force to rotatingly drive the same in second direction to shift at the second position.

The third gear of the power train is preferably mounted on a pivotal base for shifting between the first and second positions. The third gear is associated with means for restricting rotation of the third means in order to convert the rotational driving force of the disk drive into a force causing pivotal movement of the third gear between the first and second positions.

According to a further aspect of the invention, a magnetic tape cartridge compatible with a disk drive for transferring data between a magnetic tape and a disk drive head, comprises a hollow cartridge including a first section adapted to be inserted into the disk drive and a second section storing the magnetic tape, means for defining a tape run path within the first section of the cartridge, the tape run path extending across the disk drive head for transferring data between the magnetic tape and the disk drive head, means for feeding the magnetic tape along the tape run path in mutually opposite first and second directions, and means for selectively driving the magnetic tape in the first and second directions the driving means including a first gear cooperated with the feeding means for driving the latter to drive the magnetic tape in the first direction along the tape run path, a second gear cooperated with the feeding means for driving the latter to drive the magnetic tape in the second direction along the tape run path, and a third gear connected to a drive mechanism of the disk drive to be driven by driving force of the driving mechanism and movable between a first position at which the third gear engages with the first gear, and a second position at which the third gear engages with the second gear, and means for shifting the third gear between the first and second positions depending upon driving direction of the drive mechanism.

The tape run path defining means comprises means for aligning the cartridge with the disk drive when the tape cartridge is loaded into the disk drive, and means for guiding the magnetic tape within the cartridge such that, when the tape cartridge is aligned with the disk drive, the tape is registered with a location, at which data can be transferred between the magnetic tape and the disk drive head.

Preferably, the first section of the cartridge, the guide means comprises a plurality of twist tape guides, the tape wrapping about each of the twist tape guides by substantially 180 degrees to change the direction of feed of the tape and to rotate the normal to the plane of the tape by substantially 180 degrees so that the tape feeds through the first section within a disclike region, whereby first section can have a disclike shape suitable for insertion into a disk drive. The storage means comprises a first tape reel and a second tape reel between which the tape is wound, the first and second tape reels are rotatable above a rotation axis extending laterally and horizontally. The tape feeding means comprises a drive motor incorporated in the disk drive and a power train for transmitting driving force of the drive motor to the third gear, the power train including a clutch for releasably cooperating the third gear to the third gear shifting means.

On the other hand, the driving force transmitting means include a rotary disk member rotatable with a turntable of the drive mechanism about a common rotation axis thereof and the third gear is rotatable about an axis essentially parallel to the common axis of the rotary disk member and the turntable.

The third gear shifting means comprises means for converting rotational force of the third gear transmitted through the rotary disk member to a force for shifting the third gear between the first and second gears.

In practical embodiment, the first and second gears are cooperated with the first and second tape reels for rotation therewith about the laterally and horizontally extending rotation axis, and the feeding means includes means for converting rotation of the third gear about a rotation axis extending vertically thereof into a rotation of co-operated one of the first and second gears about the laterally and horizontally extending axis. The third gear is rotatably mounted on a pivotal base pivotable about its pivot axis, the third gear being cooperated with means for restricting rotation of the third gear and whereby convert the driving force of the driving mechanism into a force for causing pivotal movement of the pivotal base with the third gear. The restricting means is responsive to a resistance, created by engagement of the third gear to one of the first and second gears, against pivotal movement of the pivotal base with the third gear for releasing the third gear from restriction to allow the third gear to rotate for driving one of first and second gears to which the third gear engages.

In the alternative embodiment, the rotational force converting means comprises a pinion gear releasably coupled with the third gear and engaging with a rack plate extending along the radius of shifting of the third gear, the pinion gear being maintained at coupled condition with the third means while shifting of the third gear is permitted and released from the third gear when third gear engages with one of the first and second gears at the end of shifting thereof.

In the further alternative embodiment, the rotation converting means comprises the first and second gears comprising bevel gears and intermediate gears having a plane gear sections engageable with the third gear to be driven by the latter and bevel gear sections constantly engaging with the first and second gears for transmitting driving force input through the third means to the first and second means.

The rotation converting means comprises a bevel gear section formed in the third gear and bevel gears forming the first and second gears.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments but are for explanation and understanding only.

In the drawings.

DESCRIPTION OF THE PREFERRED EMBODIMENT

Figure 1:
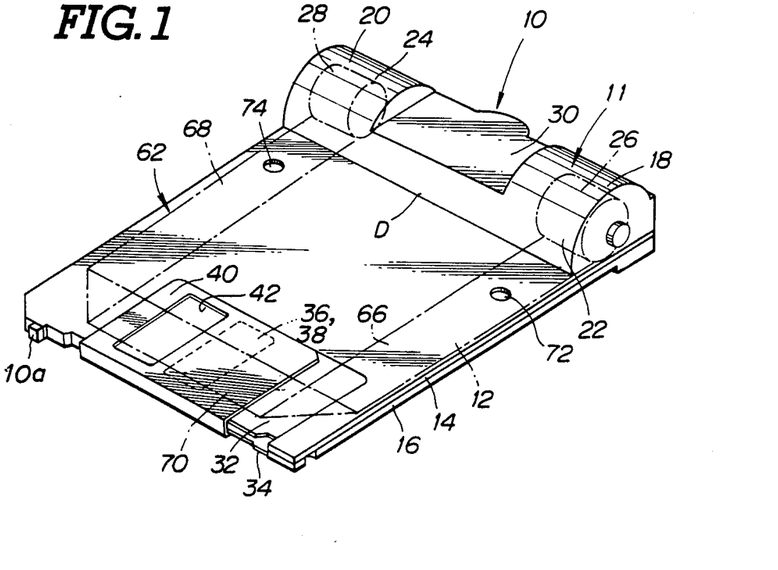
FIG. 1 is a perspective view of the preferred embodiment of a magnetic tape cartridge according to the invention.
Figure 2:
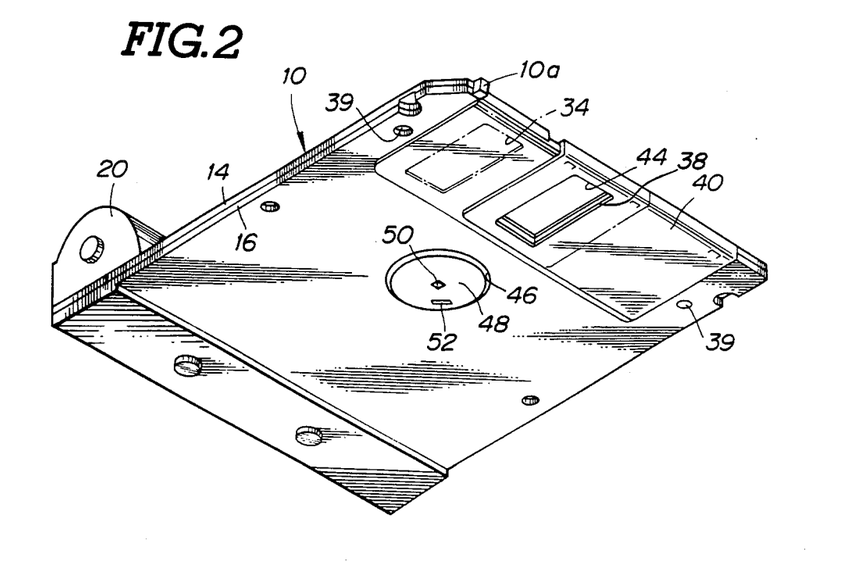
FIG. 2 is a perspective view of the preferred embodiment of the magnetic tape cartridge of FIG. 1, but showing the view as viewed from the bottom.
Figure 3:
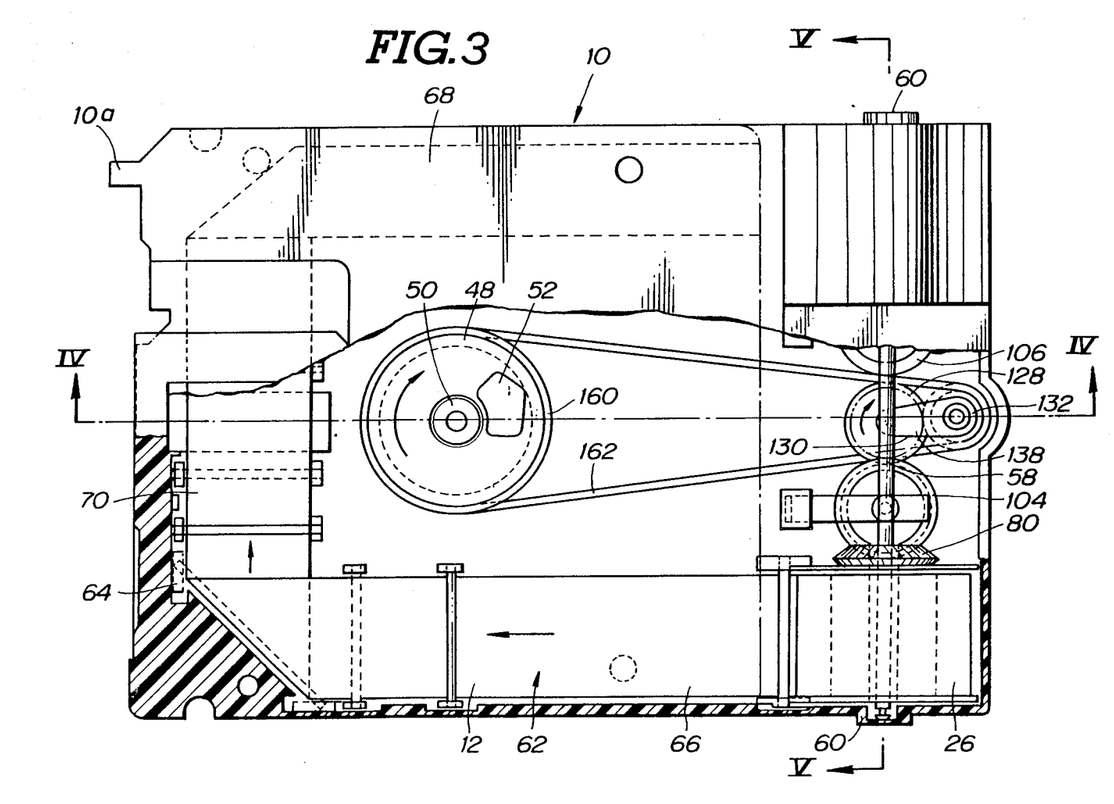
FIG. 3 is a plan view of the preferred embodiment of the magnetic tape cartridge of FIG. 1, in which a portion of an upper half of the cartridge is removed to show the first embodiment of a tape drive mechanism.

Referring now to the drawings, FIGS. 1 to 3 show the preferred embodiment of a magnetic tape cartridge 10 which is compatible with a disk drive for floppy disks of corresponding size, such as 3.5-inch microfloppy disks of the type disclosed in the U.S. Pat. No. 4,445,155.

It should be appreciated that the following discussion of the preferred embodiment of the magnetic tape cartridge according to the invention is directed to a specific type of magnetic tape cartridge, specifically, one designed for use with a 3.5-inch microfloppy disk drive. However, it should be also appreciated that the present invention is applicable to magnetic tape cartridges compatible with disk drives of any size. Furthermore, although the magnetic tape cartridge disclosed herebelow employs a magnet tape having two ends respectively wound around supply and take-up reels, the magnetic tape cartridge of the invention may also employ an endless-loop-type tape.

The preferred embodiment of the magnetic tape cartridge comprises a cartridge 10 and a magnetic tape 12 housed within the interior of the cartridge. The cartridge 10 is made up of an upper half 14 and a lower half 16. The upper and lower halves 14 and 16 are of equal size in plan view and are fixed to each other to form the cartridge 10. The cartridge 10 is of essentially the same size and shape as the microfloppy disk cartridge disclosed in U.S. Pat. No. 4,445,155 as set forth above, but is longer than the disk cartridge. The length of the normal disk cartridge relative to the length of the magnetic tape cartridge is illustrated by the phantom-line figure D in FIGS. 1 and 3. As will be appreciated herefrom, the preferred embodiment of the magnetic tape cartridge 10 has an extra section 11 which accommodates the tape reels, the tape drive mechanism and so forth. When this magnetic tape cartridge is loaded into a disk drive for which it is designed, the extra section 11 will remain outside of the disk drive, protruding from the opening of the disk drive.

As shown in FIGS. 1 and 2, the cartridge 10 is further formed with a projection 10a projecting from the front end of the cartridge. This projection 10a serves as an indicator for making the disk drive to recognize that the magnetic tape cartridge is used.

However, it would be possible to make the magnetic tape cartridge 10 match the floppy disk cartridge not only in the width and thickness but also in length, if necessary.

The upper half 14 has semi-cylindrical hollow extensions 18 and 20 near its rear corners and along its rear edge ("rear" referring to the direction of insertion into the disk drive). The semi-cylindrical hollow extensions 18 and 20 extend upwards from the upper surface of the upper half 14 and thus define tape reel receptacles 22 and 24 receiving a supply reel 26 and a take-up reel 28. A space 30 for a power train, which will be described in detail later, remains between the tape reel receptacles 22 and 24.

The upper and lower halves 14 and 16 have recesses 32 and 34 exposed to the outside on their upper and lower surfaces respectively. Longitudinally (with respect to the direction of insertion) elongated tape access apertures 36 and 38 are formed in the upper and lower halves 14 and 16 within the recesses 32 and 34. The tape access apertures 36 and 38 are aligned with each other to allow a disk drive head (not shown) of a disk drive access to the tape. The disk drive can be the same as or slightly modified from that disclosed in the foregoing U.S. Pat. No. 4,445,155. Therefore, the disclosure concerning the disk drive in the U.S. Pat. No. 4,445,155 is hereby incorporated by reference for the sake of disclosure.

The upper and lower halves 14 and 16 also have positioning holes 39 for positioning the tape cartridge 10 within the disk drive. The positioning holes 39 of the upper and lower halves 14 and 16 are aligned with each other and are designed to receive a positioning pin (not shown) built into the disk drive.

A sliding shutter 40 slidingly engages the recesses 32 and 34. Upper and lower surfaces of the sliding shutter 40 lie essentially flush with the upper and lower surfaces of the cartridge 10 as assembled. The sliding shutter 40 has longitudinally elongated apertures 42 and 44 of the same size and configuration as the tape access apertures 36 and 38 of the cartridge 10. The sliding shutter 40 is movable between a closed position, in which the apertures 42 and 44 offset from the tape access apertures 36 and 38 and thus hiding the tape 12 and an open position, in which the apertures 42 and 44 are aligned with the tape access apertures 36 and 38 to allow the disk drive head access to the tape. The sliding shutter 40 is normally biased by a spring (not shown) toward the closed position and is actuated to the open position when the magnet tape cartridge is inserted into the disk drive.

Figure 4:
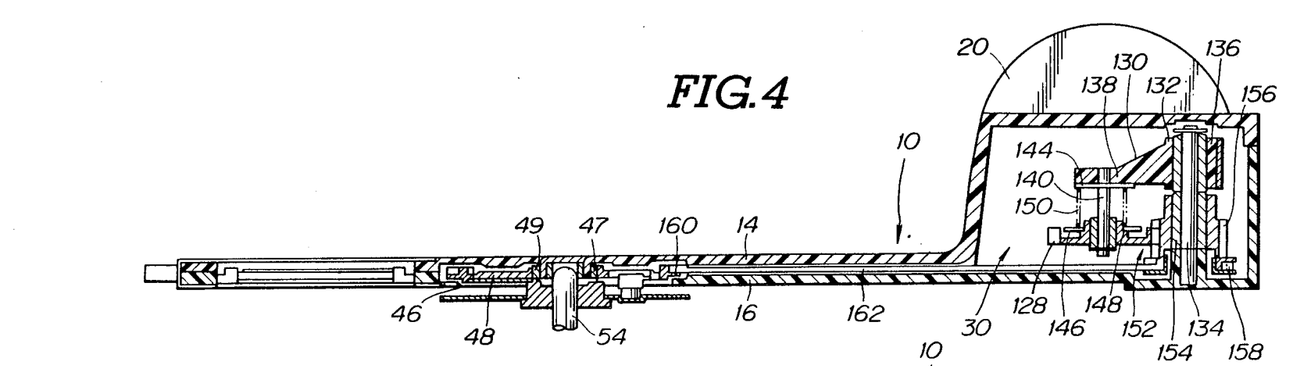
FIG. 4 is a longitudinal section the preferred embodiment of the magnetic tape cartridge with the first embodiment of the tape drive mechanism, which section is taken along line IV—IV of FIG. 3.

The lower half 16 also has a central aperture 46. A center core disk 48 is rotatably mounted on a boss 47 extending from the lower surface of the upper half 14 through a bearing 49, such as an oilless metal bearing, as shown in FIG. 4. The center core disk 48 opposes the center aperture 46 in the lower half 16 and is thus exposed through the center aperture 46 of the lower half. The center core disk 48 has a center positioning aperture 50 and a driving and positioning aperture 52. The driving and positioning aperture 52 is offset by a given distance from the center positioning aperture. The center positioning aperture 50 is designed to engage a disk drive motor spindle 54. On the other hand, the driving and positioning aperture 52 is designed to engage a driving pin mounted on a turntable (not shown) which is driven to rotate by the motor spindle 54. Therefore, the center core disk 48 is driven to rotate by the driving force transmitted through the turntable of the disk drive.

Figure 5:
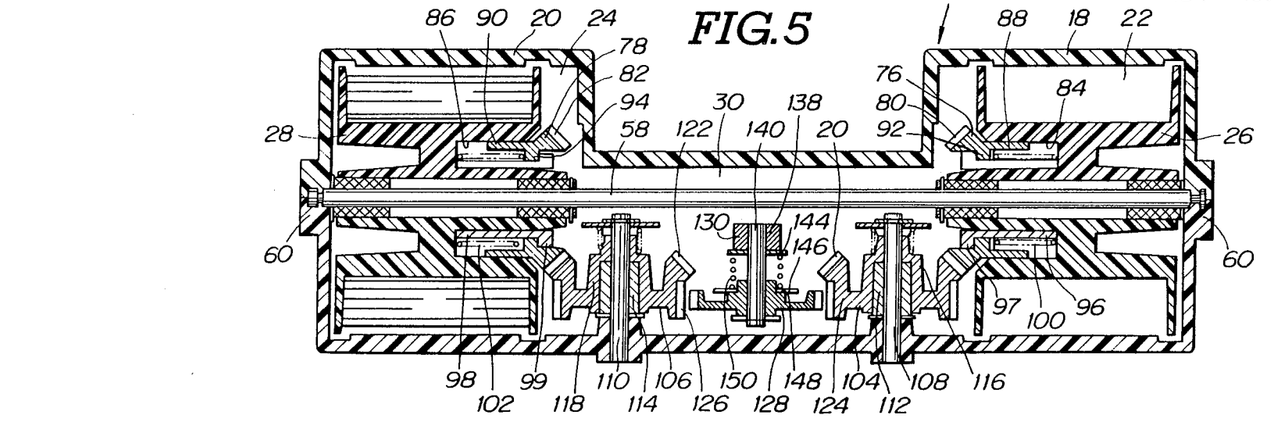
FIG. 5 is a cross-section of the preferred embodiment of the magnetic tape cartridge taken along line V—V of FIG. 3.
Figure 6:
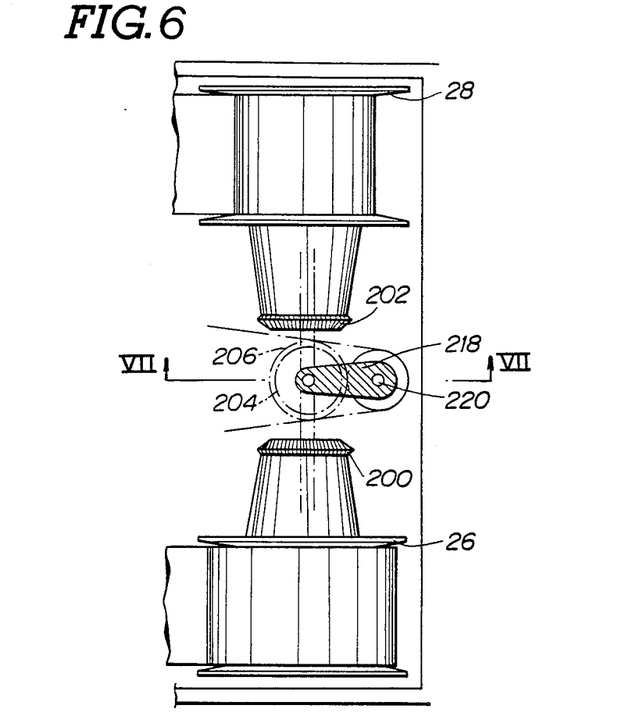
FIG. 6 is a partial plan view of the magnetic tape cartridge having the second embodiment of the tape drive mechanism.
Figure 7:
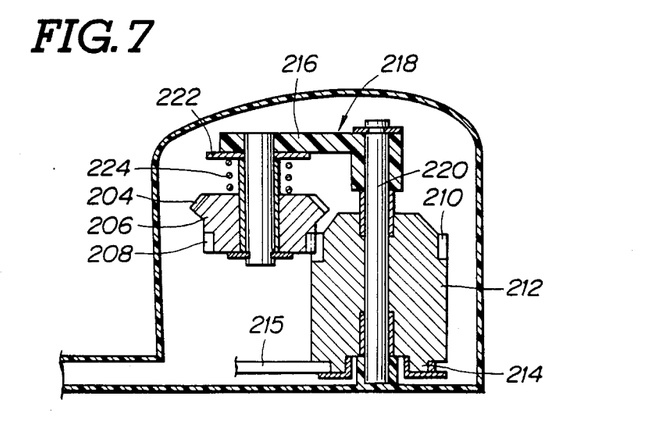
FIG. 7 is a section taken along line VII—VII of FIG. 6.
Figure 8:
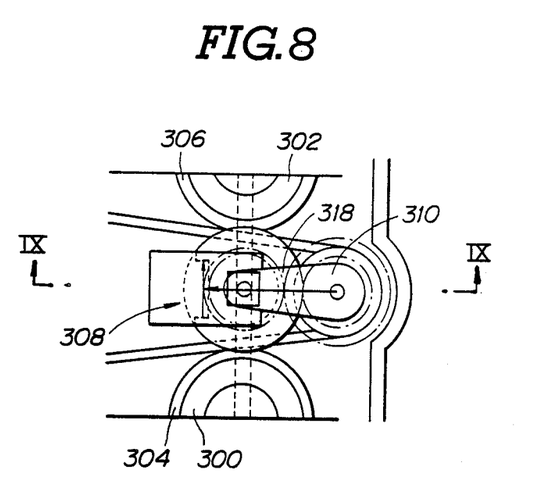
FIG. 8 is a partial plan view of the magnetic tape cartridge having the third embodiment of the tape drive mechanism.
Figure 9:
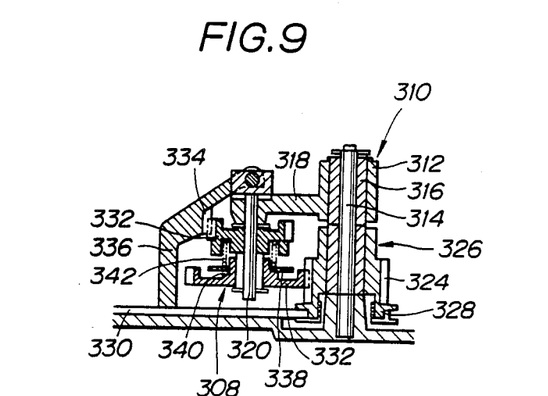
FIG. 9 is a section taken along line IX—IX of FIG. 8.

The supply and tape-up reels 26 and 28 are rotatably supported by a support shaft 58, the ends of which are fixed to boss sections 60 formed on the side walls of the semi-cylindrical extensions 18 and 20 as shown in FIG. 5. Therefore, the supply and take-up reels 26 and 28 are mounted within the tape reel receptacles 22 and 24 with their axes lying transverse. A tape run path 62 is defined within the thin space defined in the front portion of the cartridge along which the magnetic tape passes between the tape access apertures 36 and 38. Tape guides 64 define the tape run path 62. As will be seen from FIGS. 1 and 3, the tape run path 62 has a first section 66 near the supply reel 26 and extending longitudinally along one edge of the cartridge, a second section 68 near the take-up reel 28 and extending longitudinally along the other edge of the cartridge, and a third section 70 extending laterally across the front edge and between the tape access apertures 36 and 38. At the junctures of the first section 66 and third section 70, and of the second section 68 and third section 70, the tape guides 66 are provided to deflect the tape.

In this disclosure, the word "longitudinal" used in connection with the tape path means the axis of movement along the first and second sections 66 and 68 of the tape run path 62 set forth above, and the word "lateral" used in connection with the tape path means the axis of movement along the third section 70 of the tape run path 62 set forth above.

The upper and lower halves 14 and 16 have circular openings 72 and 74 opposing the first and second sections 66 and 68 of the tape run path 62. Through the openings 72 and 74, tape run path 62 can be monitored to detect the presence or absence of the tape. This tape monitoring mechanism per se is well known technique in tape recording and/or reproducing apparatus.

In order to selectively drive the supply reel 26 and the take-up reel 28 for recording and/or reproduction in forward and reverse directions, the preferred embodiment of the magnetic tape cartridge according to the present invention, is provided with a specially designed tape drive mechanism. In general, the take-up reel 28 is driven to extract the magnetic tape 12 from the supply reel through the tape run path 62 during recording and reproduction. This tape direction will be hereafter referred to as "forward". On the other hand, the supply reel 26 must be driven to extract the magnetic tape 12 from the take-up reel 28 during rewinding. The supply reel 26 drives the magnetic tape 12 through the tape run path 62 in the direction opposite to the forward direction. This direction will hereafter be referred to as "revrse".

The tape drive mechanism includes a pair of bevel gear blocks 76 and 78 as shown in FIGS. 4 and 5. The bevel gear blocks 76 and 78 are generally cylindrical and have bevel gears 80 and 82 respectively at one end thereof. The bevel gear blocks 76 and 78 are co-axially mounted on the mutually opposing axial ends of the supply reel 26 and the take-up reel 28. In practice, as best shown in FIG. 5, the supply reel 26 and the take-up reel 28 are formed with annular grooves 84 and 86. The cylindrical sections 88 and 90 of the bevel gear blocks 76 and 78 are inserted into the annular grooves 84 and 86 of the supply reel 26 and the take-up reel 28. Annular projections 92 and 94 are formed on the inner periphery of the cylindrical sections 88 and 90 of the bevel gear blocks 76 and 78. Cylindrical retainers 96 and 98 with flanges 97 and 99 are fitted into the annular grooves 84 and 86 so as to retain the cylindrical sections 88 and 90 of the bevel gear blocks 76 and 78 within the annular grooves 84 and 86. Compression coil springs 100 and 102 are also disposed within the annular grooves 84 and 86. One ends of the springs 100 seat on the bottom of the annular grooves and the other ends thereof seat on the annular projections 92 and 94 of the cylindrical sections 88 and 90 in order to bias the bevel gear blocks 76 and 78 against the flanges 97 and 99 of the retainers 96 and 98.

The bevel gear blocks 76 and 78 are rotatable with the supply reel 26 and the take-up reel 28. If necessary, the bevel gear blocks 76 and 78 are keyed to the inner periphery of the annular grooves 84 and 86 with suitable keying means so as to ensure rotation with the associated supply reel 26 and take-up reel 28.

A pair of intermediate gear blocks 104 and 106 are rotatably supported by gear shafts 108 and 110 extending vertically from the floor of the cartridge 10. Bearings 112 and 114 are disposed between the gear shafts 108 and 110 and cylindrical sections 116 and 118 of the intermediate gear blocks 104 and 106. The gear shafts 108 and 110 are arranged in lateral alignment at a given distance from each other. The distance between the gear shafts 108 and 110 is slightly greater than or approximately equal to twice the outer diameter of the intermediate gear blocks 104 and 106. The intermediate gear blocks 104 and 106 have bevel gears 120 and 122 respectively at their upper ends. Respective bevel gears 120 and 122 constantly engage the corresponding bevel gears 80 and 82.

The intermediate gear blocks 104 and 106 also have plane gears 124 and 126 below the bevel gears 120 and 122. The plane gears 124 and 126 lie in the same horizontal plane at a given distance from each other. As set forth above, since the gear shafts 108 and 110 are separated by a distance slightly greater than or approximately equal to the outer diameter of the intermediate gear blocks 104 and 106, the distance between the plane gears 124 and 126 is slightly greater than the outer diameter thereof.

A two-way coupling gear 128 is disposed between the plane gears 124 and 126. The two-way coupling gear 128 is mounted on a pivotal base 130. The pivotal base 130 has a cylindrical base section 132 pivotably mounted at the top of a pivot shaft 134 extending vertically from the floor of the cartridge 10. A sleeve bearing 136 is interposed between the inner periphery of the cylindrical base section 132 and the outer periphery of the pivot shaft 134 to allow pivotal movement of the pivotal base. The pivotal base 130 also has a pivoting arm 138. A gear shaft 140 extends downward from the pivotal arm 138. Adjacent its lower end, the gear shaft 140 mounts the two-way coupling gear 128. The two-way coupling gear 128 is rotatable about the gear shaft 140. A sleeve bearing 142 is disposed between the contacting faces of the gear shaft 140 and the two-way coupling gear 120.

An annular slip plate 144 loosely engages the gear shaft 140 for the two-way coupling gear 128. Also, an annular-disc-shaped spring seat 146 engages the stepped outer periphery 148 of the two-way coupling gear 128. A compression coil spring 150 is disposed between the slip plate 144 and the spring seat 146 to exert a biasing spring force on the slip plate 144 for frictional engagement with the lower surface of the pivoting arm 138. At the same time, the spring force of the compression coil spring 150 is exerted on the two-way coupling gear 128 through the spring seat 146. The slip plate 144 and the coil spring 150 constitute a clutch mechanism which causes the pivotal base to pivot so as to bring the two-way coupling gear 128 into engagement with one of the plane gears 124 and 126 of the intermediate gear blocks 104 and 106, depending on the direction of rotation of the two-way gear 128.

A drive gear block 152 is mounted at the lower end of the pivot shaft 134 through a sleeve bearing 154. The drive gear block 152 has a drive gear 156 constantly engaging the two-way coupling gear 128. The drive gear block 152 also has a pulley 150 integrally formed with the drive gear 156. The pulley 158 is connected to a pulley 160 integral with the center core disk 48 by means of a driving belt 162.

It should be appreciated that the gear ratio of the aforementioned tape drive mechanism is selected so as to drive the magnetic tape at a speed equal to the rotation speed of a floppy disk on the same disk drive. Specifically, the tape speed at the third section 70 of the tape run path 62 has to be equal to the rotation speed of the floppy disk, so that the disk drive can use the same recording and reproduction operations without adjustment.

For this purpose, speaking of a conventional 3.5 inch floppy disk, it rotates at about 600 r.p.m. so as to be free of peak-shift errors and data droppage. Therefore, if it is assumed that the linear velocity of the outermost track is $V_1$ and that of the innermost track is $v_2$, it is favorable that the feed rate v of the magnetic tape according to the invention be $V_2 < V < V_1$.

In order to drive the magnetic tape forward (from the supply reel 26 onto the take-up reel 28), the turntable is driven clockwise in FIG. 3. According to clockwise rotation of the turntable, the center core disk 48 is driven clockwise. The clockwise rotational force is transmitted from the pulley 160 of the center core disk 48 to the pulley 158 of the drive gear block 152 through the drive belt 162. Therefore, the drive gear 156 is driven to rotate clockwise in FIG. 3.

As long as the two-way coupling gear 128 remains free of the plane gears 124 and 126 of the intermediate gear blocks 104 and 106, the slip plate 144 maintains frictional engagement with the mating surface of the pivoting arm 138 of the pivotal base 130 due to the spring force of the coil spring 150. Therefore, the rotational force transmitted by the drive gear 156 of the drive gear block 152 to the two-way coupling gear 128 serves to drive the pivotal base 130 to pivot clockwise.

Once the two-way coupling gear 128 comes into engagement with the plane gear 126 of the intermediate gear block 106, pivotal movement of the pivotal base 130 is restricted. Then the rotational driving force transmitted by the drive gear 156 to the two-way coupling gear 128 overcomes the spring force of the coil spring 150 and so causes slip between the mating surfaces of the slip plate 144 and the pivoting arm 138. As a result, the two-way coupling gear 128 starts to rotate counterclockwise, thereby driving the plane gear 126 of the intermediate gear clockwise. The bevel gear 122 of the intermediate gear block 106 thus rotates clockwise, which causes the bevel gear 76 to drive the take-up reel 28 to wind in the magnetic tape 12.

On the other hand, in order to switch from forward to reverse, the direction of rotation of the turntable is switched from clockwise to counterclockwise as viewed in FIG. 3. According to counterclockwise rotation of the turntable, the center core disk 48 is driven counterclockwise. The counterclockwise rotational force is transmitted from the pulley 160 of the center core disk 48 to the pulley 158 of the drive gear block 152 through the drive belt 162. Therefore, the drive gear 156 is driven counterclockwise in FIG. 3.

As long as the two-way coupling gear 128 remains free of the plane gear 124 of the intermediate gear block 104, the slip plate 144 maintains frictional engagement with the mating surface of the pivoting arm 138 of the pivotal base 130 due to the spring force of the coil spring 150 as the two-way coupling gear 128 becomes free from the clockwise rotational force of the drive gear 156. Therefore, the counterclockwise rotational force transmitted by the drive gear 156 of the drive gear block 152 to the two-way coupling gear 128 serves as a driving force for the pivotal base 130, causing the pivotal base to pivot counterclockwise in FIG. 3.

Once the two-way coupling gear 128 comes into engagement with the plane gear 124 of the intermediate gear block 104, pivotal movement of the pivotal base 130 is restricted. Then, the rotational driving force transmitted by the drive gear 156 to the two-way coupling gear 128 overcomes the spring force of the coil spring 150, causing slip between the mating surfaces of the slip plate 144 and the pivoting arm 138. As a result, the two-way coupling gear 128 starts to rotate clockwise, thus driving the plane gear 124 of the intermediate gear 104 counterclockwise. The bevel gear 120 of the intermediate gear block 104 is thus rotated clockwise.

ways without departing from the principle of the invention. Therefore, the invention should be understood to include all possible embodiments and modifications to the shown embodiments which can be embodied without departing from the principle of the invention set out in the appended claims.

What is claimed is:

1. A magnetic tape cartridge for use with a disk drive for transferring data between a magnetic tape within said cartridge and a disk drive head, comprising:
   means for defining a tape run path for passing across said disk drive head for transferring data between said magnetic tape and said disk drive head;
   first and second reels arranged within said cartridge at respective ends of said tape run path and having said magnetic tape wound therearound, said first and second reels being rotatably mounted for feeding said magnetic tape from one reel to the other reel;
   mean arranged within said cartridge for selectively driving one of said first and second tape reels for winding said magnetic tape thereon from the other reel, said means for driving including a first gear mounted for rotation with said first reel, a second gear mounted for rotation with said second reel and a third gear connected for rotation by a drive mechanism of said disk drive and selectively cooperating with one of said first and second gears in response to a selected driving direction of said drive mechanism.

2. A magnetic tape cartridge as set forth in claim 1, which further comprises means for transmitting driving force of said drive mechanism of said disk drive to said third gear.

3. A magnetic tape cartridge as set forth in claim 2, wherein said driving force transmitting means include a rotary disk member rotatable with a turntable of said drive mechanism about a common rotation axis thereof and said third gear is rotatable about an axis essentially parallel to said common axis of said rotary disk member and said turntable.

4. A magnetic tape cartridge as set forth in claim 3, which further comprises means for converting rotational force of said third gear to a force for shifting said third gear between said first and second gears.

5. A magnetic tape cartridge as set forth in claim 4, wherein said third gear is rotatably mounted on a pivotal base pivotable about its pivot axis, said third gear being cooperated with means for restricting rotation of said third gear and whereby converts the driving force of the driving mechanism into a force for causing pivotal movement of said pivotal base with said third gear.

6. A magnetic tape cartridge as set forth in claim 5, wherein said restricting means is responsive to a resistance, created by engagement of said third gear to one of said first and second gears, against pivotal movement of said pivotal base with said third gear for releasing said third gear from restriction to allow said third gear to rotate for driving one of first and second gears to which said third gear engages.

7. A magnetic tape cartridge as set forth in claim 4, wherein said rotational force converting means comprises a pinion gear releasably coupled with said third gear and engaging with a rack plate extending along the radius of shifting of said third gear, said pinion gear being maintained at coupled condition with said third means while shifting of said third gear is permitted and released from said third gear when third gear engages with one of said first and second gears at the end of shifting thereof.

8. A magnetic tape cartridge as set forth in claim 1, wherein said tape reel driving means includes means for converting rotation of said third means about said rotation axis thereof into a rotation of co-operated one of said first and second gears about an axis extending essentially perpendicular to said rotation axis of third gear, which first and second gears are rotatable about common axes to the corresponding first and second reels.

9. A magnetic tape cartridge as set forth in claim 8, wherein said rotation converting means comprises said first and second gears comprising bevel gears and intermediate gears having a plane gear sections engageable with said third gear to be driven by the latter and bevel gear sections constantly engaging with said first and second gears for transmitting driving force input through said third means to said first and second means.

10. A magnetic tape cartridge as set forth in claim 8, wherein said rotation converting means comprises a bevel gear section formed in said third gear and bevel gears forming said first and second gears.

11. A magnetic tape cartridge for use with a floppy-disk drive, comprising:
   a cartridge having a first section of substantially the same width and configuration as a corresponding selected floppy disk and defining therein a tape run path extending across a position at which data is transferred between a magnetic tape within said cartridge and a magnetic head, and a second section formed at the rear of said first section relative to said position and defining a space;
   a supply reel and a take-up reel disposed within said space defined within said second section of said cartridge, said supply reel and said take-up reel being rotatable about an axis extending laterally relative to said cartridge;
   a first gear coupled with said supply reel for rotation therewith;
   a second gear coupled with said take-up reel for rotation therewith; and
   a power train for selectively transmitting driving force of the floppy-disk drive to one of said first and second gears, said power train including a third gear selectively movable between a first position where said driving force of said disk drive is transmitted to said first gear, and a second position where said driving force is transmitted to said second gear, and a pivotable base mounting said third gear being responsive to a rotational driving force of said disk drive in a first direction to shift said third gear to said first position and to a rotational driving force of said disk drive in a second direction to shift said third gear to said second position.

12. A disk-drive-compatible magnetic tape cartridge as set forth in claim 11, wherein said third gear of said power train is mounted on a pivotal base for shifting between said first and second positions.

13. A disk-drive-compatible magnetic tape cartridge as set forth in claim 12, wherein said third gear is associated with means for restricting rotation of said third means in order to convert said rotational driving force of said disk drive into a force causing pivotal movement of said third gear between said first and second positions.

14. A magnetic tape cartridge compatible with a floppy-disk disk drive having a drive mechanism for transferring data between a magnetic tape in the cartridge and a disk drive head, comprising:
- a hollow cartridge including a first section adapted to cooperate with said disk drive and a second section storing said magnetic tape;
- means for defining a tape run path within said first section of said cartridge, said tape run path extending across said disk drive head for transferring data between said magnetic tape and said disk drive head;
- means for feeding said magnetic tape along said tape run path in mutually opposite first and second directions; and
- means for selectively driving said magnetic tape in said first and second directions, said means for driving including a first gear cooperating with said means for feeding for driving said magnetic tape in said first direction along said tape run path, a second gear cooperating with said means for feeding for driving said magnetic tape in said second direction along said tape run path, and a third gear connected to the drive mechanism of said disk drive and movable between a first position at which said third gear engages with said first gear, and a second position at which said third gear engages with said second gear; and
- means for shifting said third gear between said first and second positions connected to the drive mechanism of said disk drive depending upon a driving direction of said drive mechanism.

15. A magnetic tape cartridge as set forth in claim 14, wherein said tape run path defining means comprises:
- means for aligning said cartridge with said disk drive when said tape cartridge is loaded into the disk drive; and
- means for guiding the magnetic tape within the cartridge such that, when the tape cartridge is aligned with the disk drive, the tape is registered with a location, at which data can be transferred between said magnetic tape and said disk drive head.

16. A magnetic tape cartridge as set forth in claim 14, wherein, within said first section of said cartridge, the guide means comprises a plurality of twist tape guides, said tape wrapping about each of said twist tape guides by substantially 180 degrees to change the direction of feed of the tape and to rotate the normally to the plane of the tape by substantially 180 degrees so that the tape feeds through said first section within a disclike region, whereby first section can have a disclike shape suitable for insertion into a disk drive.

17. A magnetic tape cartridge as in claim 16, wherein the storage means comprises a first tape reel and a second tape reel between which the tape is wound, said first and second tape reels are rotatable above a rotation axis extending laterally and horizontally, 18. A magnetic tape cartridge as set forth in claim 17, wherein said first and second gears are cooperated with said first and second tape reels for rotation therewith about said laterally and horizontally extending rotation axis, and said feeding means includes means for converting rotation of said third gear about a rotation axis extending vertically thereof into a rotation of co-operated one of said first and second gears about said laterally and horizontally extending axis.

19. A magnetic tape cartridge as set forth in claim 18, wherein said third gear is rotatably mounted on a pivotal base pivotable about its pivot axis, said third gear being cooperated with means for restricting rotation of said third gear and whereby convert the driving force of the driving mechanism into a force for causing pivotal movement of said pivotal base with said third gear.

20. A magnetic tape cartridge as set forth in claim 19, wherein said restricting means is responsive to a resistance, created by engagement of said third gear to one of said first and second gears, against pivotal movement of said pivotal base with said third gear for releasing said third gear from restriction to allow said third gear to rotate for driving one of first and second gears to which said third gear engages.

21. A magnetic tape cartridge as set forth in claim 18, wherein said rotational force converting means comprises a pinion gear releasably coupled with said third gear and engaging with a rack plate extending along the radius of shifting of said third gear, said pinion gear being maintained at coupled condition with said third means while shifting of said third gear is permitted and released from said third gear when third gear engages with one of said first and second gears at the end of shifting thereof.

22. A magnetic tape cartridge as set forth in claim 18, wherein said rotation converting means comprises said first and second gears comprising bevel gears and intermediate gears having a plane gear sections engageable with said third gear to be driven by the latter and bevel gear sections constantly engaging with said first and second gears for transmitting driving force input through said third means to said first and second means.

23. A magnetic tape cartridge as set forth in claim 22, wherein said rotation converting means comprises a bevel gear section formed in said third gear and bevel gears forming said first and second gears.

24. A magnetic tape cartridge as set forth in claim 17, wherein said tape feeding means comprises a drive motor incorporated in said disk drive and a power train for transmitting driving force of said drive motor to said third gear, said power train including a clutch for releasably cooperating said third gear to said third gear shifting means.

25. A magnetic tape cartridge as set forth in claim 14, wherein said driving force transmitting means include a rotary disk member rotatable with a turntable of said drive mechanism about a common rotation axis thereof and said third gear is rotatable about an axis essentially parallel to said common axis of said rotary disk member and said turntable.

26. A magnetic tape cartridge as set forth in claim 25, wherein said third gear shifting means comprises means for converting rotational force of said third gear transmitted through said rotary disk member to a force for shifting said third gear between said first and second gears.

* * * * *

UNITED STATES PATENT AND TRADEMARK OFFICE
CERTIFICATE OF CORRECTION

PATENT NO. : 4,896,237
DATED : January 23, 1990
INVENTOR(S) : Toshiro Ohta

It is certified that error appears in the above-identified patent and that said Letters Patent is hereby corrected as shown below:

Col. 8, line 23, change "revise" to --reverse--

Col. 11, line 36, change "driven-directly" to --driven directly--

IN THE CLAIMS:

Col. 15, line 46, change "normally" to --normal--

Signed and Sealed this

Sixteenth Day of April, 1991

Attest:

HARRY F. MANBECK, JR.

Attesting Officer     Commissioner of Patents and Trademarks